(12) United States Patent
Hu et al.

(10) Patent No.: US 11,863,441 B2
(45) Date of Patent: Jan. 2, 2024

(54) METHODS AND SYSTEMS FOR GENERATING DATA PACKETS IN SMART NETWORK INTERFACE CONTROLLERS

(71) Applicant: VMware, Inc., Palo Alto, CA (US)

(72) Inventors: PeiPei Hu, Beijing (CN); Chengjian Wen, Beijing (CN); Shu Wu, Beijing (CN); Qin Li, Beijing (CN); Hao Huang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/673,652

(22) Filed: Feb. 16, 2022

(65) Prior Publication Data
US 2023/0216789 A1    Jul. 6, 2023

(30) Foreign Application Priority Data
Jan. 3, 2022    (WO) ................ PCT/CN2022/070007

(51) Int. Cl.
*H04L 45/00*    (2022.01)
*H04L 45/745*    (2022.01)
*H04L 67/306*    (2022.01)
*H04L 69/22*    (2022.01)
*H04L 45/42*    (2022.01)

(52) U.S. Cl.
CPC ............ *H04L 45/566* (2013.01); *H04L 45/42* (2013.01); *H04L 45/745* (2013.01); *H04L 67/306* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 8,402,498 | B2* | 3/2013 | George | H04N 21/4396 |
| | | | | 725/141 |
| 9,444,766 | B2* | 9/2016 | McCormick | H04L 49/25 |
| 9,600,313 | B2* | 3/2017 | Nimmagadda | G06F 13/00 |
| 2011/0085451 | A1* | 4/2011 | Takahara | H04L 43/50 |
| | | | | 709/224 |
| 2012/0226804 | A1* | 9/2012 | Raja | H04L 43/028 |
| | | | | 709/224 |
| 2021/0218677 | A1* | 7/2021 | Wang | H04L 47/24 |
| 2022/0358002 | A1* | 11/2022 | Zhong | G06F 9/546 |

\* cited by examiner

*Primary Examiner* — James A Edwards (57) ABSTRACT

This disclosure is directed to processes and systems for generating data packets in a smart network interface controller ("SNIC") of a host server computer. A smart packet generator ("spktgen") controller receives a user command that contains directions for how packets are generated in the SNIC. The command is sent to a spktgen daemon that runs in a control core of the multicore processor. The spktgen daemon extracts the type of packet generator and packet parameters recorded in the command and sends the type of packet generator and packet parameters to a spktgen engine that also runs in the control core. The spktgen engine creates threads in each of one or more data cores of the multicore processor. Each thread comprises instructions for generating data packets from the data generated by data generating sources of the host in accordance with the type of packet generator and the packet parameters.

12 Claims, 10 Drawing Sheets

METHODS AND SYSTEMS FOR GENERATING DATA PACKETS IN SMART NETWORK INTERFACE CONTROLLERS

TECHNICAL FIELD

This disclosure is directed to communication channels between a host and an internal smart network interface controller.

BACKGROUND

Data centers are composed of networked server computers (also called "hosts") and storage appliances that are used to organize, process, and store large amounts of data. Data centers are made possible by advances in virtualization, computer networking, distributed operating systems and applications, data storage appliances, computer hardware, and software technologies. In recent years, an increasing number of enterprises, governments, and other organizations rent processing and data storage services as data center tenants from data center operators. Data center tenants conduct business and provide cloud services over the internet on platforms that are maintained and run entirely in data centers. For example, data centers have enabled private companies to move data processing and storage to the cloud, thereby reducing the cost of maintaining their own centralized computing networks and hosts.

The hosts and data storage appliances are interconnected over a data center network ("DCN") to form a pool of computational and data storage resources for data center tenants. Before data generated within a host is placed on the DCN and sent to another host in the data center or a computer system on the internet, the data is processed by a packet generator running on the host. A packet generator runs a networking protocol that is implemented in software. The networking protocol applies a set of rules for partitioning a block of data, such as an image, audio file or a video file, into smaller data segments called "payloads." The networking protocol attaches a header to each payload to form a data packet. The header contains routing information, such as the IP address of the host that generated the packet and the IP address of a destination. The destination can be another host in the data center or a computer system on the internet. The header also contains a packet length field and a protocol identifier that identifies the networking protocol used to generate the packet. The networking protocol may also attach trailer bits that identify the end of the packet. The packets originating from the same block of data generated in a host do not necessarily travel the same communications path in the DCN or the internet to reach a destination. The packets are typically routed along different communications to the destination which uses the protocol identifier of each packet to apply the corresponding networking protocol for reassembly of the payloads into the original block of data.

The flow rate of data packets leaving a host is often determined by where a packet generator is located within a host. A packet generator may run in the user space of a host or in a module of the kernel space of the host. For example, a packet generator running in the user space sends packets to a protocol stack, such the TCP/IP protocol, running in the kernel space then the packets are sent directly to a driver of a network interface controller ("NIC"), and finally to the NIC where the packets are placed on the DCN. By contrast, packets generated by a packet generator running in the kernel space are sent directly to the driver and then to the NIC without using a protocol stack, which eliminates the protocol stack from impacting performance of the packet generator. Both types of packet generation are vulnerable to packet jitter in the packer flow rate, which is characterized as variations in the latency (i.e., time delay) between sending data packets. Large latencies disrupt the flow of packets to a destination, which can lead to artifacts that degrade the quality of data assembled at the destination. Datacenter operators and data center tenants seek methods and systems that generate data packets with a consistent packet flow rate, thereby substantially reducing the adverse effects of packet jitter.

SUMMARY

This disclosure is directed to processes and systems for generating data packets in a smart network interface controller ("SNIC") of a host server computer. The SNIC includes a multicore processor. A smart packet generator ("spktgen") controller executing in a user space of the host receives a user command entered in a user interface of a management computer system of the data center. The user command contains directions for how packets are generated in the SNIC. The spktgen controller sends the command via an SNIC driver running in the kernel space of the host to a spktgen daemon running in a control core of the multicore processor. The spktgen daemon extracts information regarding a type of packet generator selected by the user and extracts packet parameters recorded in the command. The spktgen daemon sends the type of packet generator and packet parameters extracted from the command to a spktgen engine that also runs in the control core. The spktgen engine creates threads in each of one or more data cores of the multicore processor. Each thread comprises instructions for generating data packets from the data generated by data generating sources of the host in accordance with the type of packet generator and the packet parameters. Generating data packets in the data cores of the multicore processor enables the data packets to be generated with a consistent packet flow rate.

DETAILED DESCRIPTION

Figure 1:
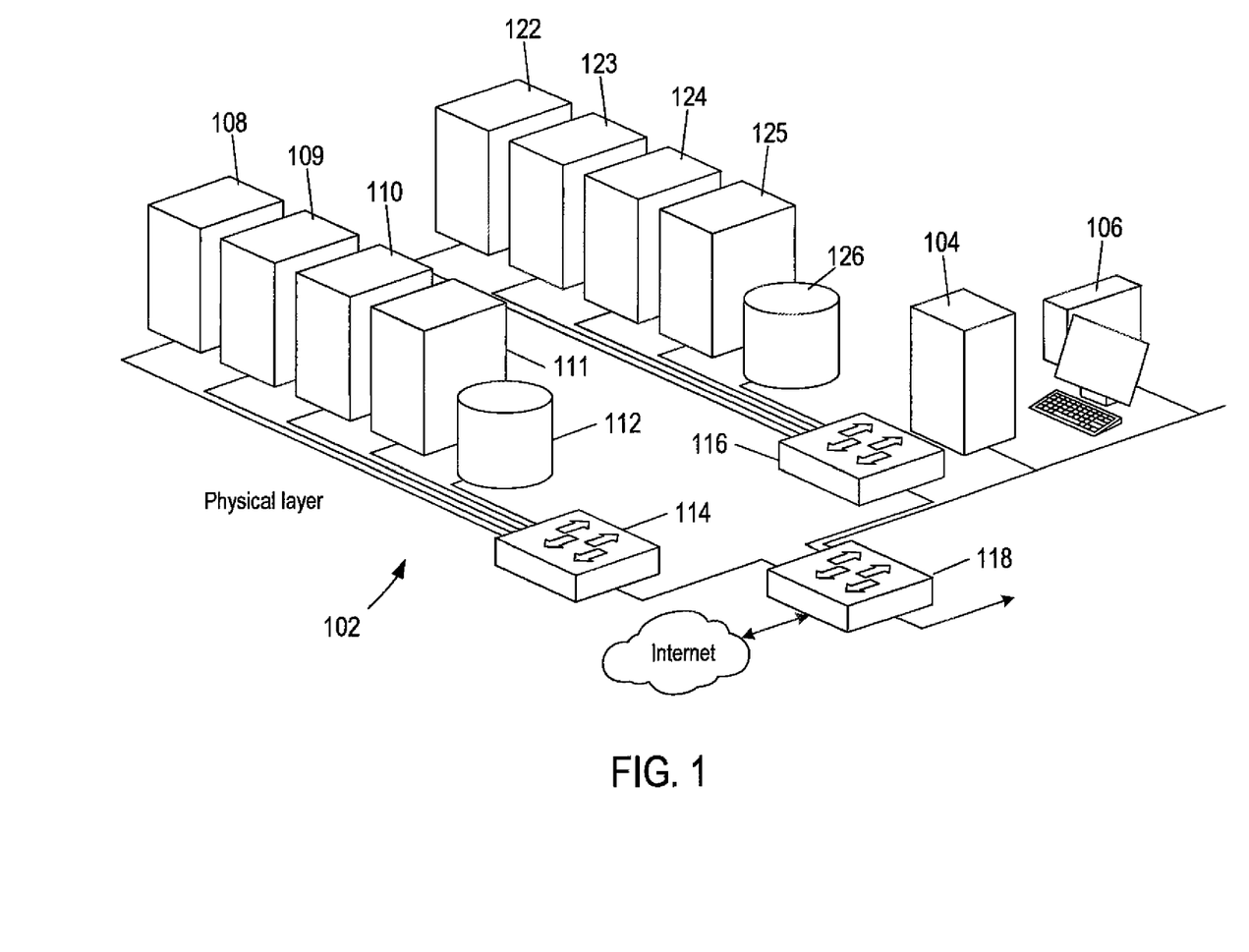
FIG. 1 shows an example of a data center.

This disclosure presents computer-implemented processes for generating data packets in smart network interface controllers ("SNIC") of hosts. FIG. 1 shows an example of a data center 102. The data center 102 comprises a management server computer 104 and any of various computers, such as PC 106, on which a virtual-data-center management user interface may be displayed to system administrators and other users. Objects of the physical data center 102 additionally include server computers, called "hosts," such as hosts 108-111 and 122-125, mass-storage devices 112 and 126, switches 114 and 116, and a top of rack ("TOR") switch 118. In the example of FIG. 1, the switch 114 interconnects the hosts 108-111 and mass-storage devices 112, and the switch 116 interconnects the hosts 122-125 and the mass-storage devices 126. The TOR switch 118 interconnects the hosts 108-111 to the hosts 122-125, the internet, the virtual-data-center management server 104, the PC 106, and other server computers and mass-storage appliances of the data center (not shown). Physical data centers may include a multitude of hosts, data storage devices, networking components, and devices connected according to many different types of connection topologies.

Virtualization has made a major contribution to enterprises, governments, and other organizations moving data processing and data storage services to data centers. Virtualization provides for the creation of software-based, or virtual, representations of server computers, data-storage devices, and networks. For example, a virtual computer system, known as a virtual machine ("VM"), is a self-contained application and operating system implemented in software. Software components of a distributed application may be executed separately in VMs. A VM may be created or destroyed on demand and may be migrated from one physical server computer to another in a data center. Virtualization has enabled scaling of distributed applications and distributed computing systems to meet changing user demand.

Figure 2:
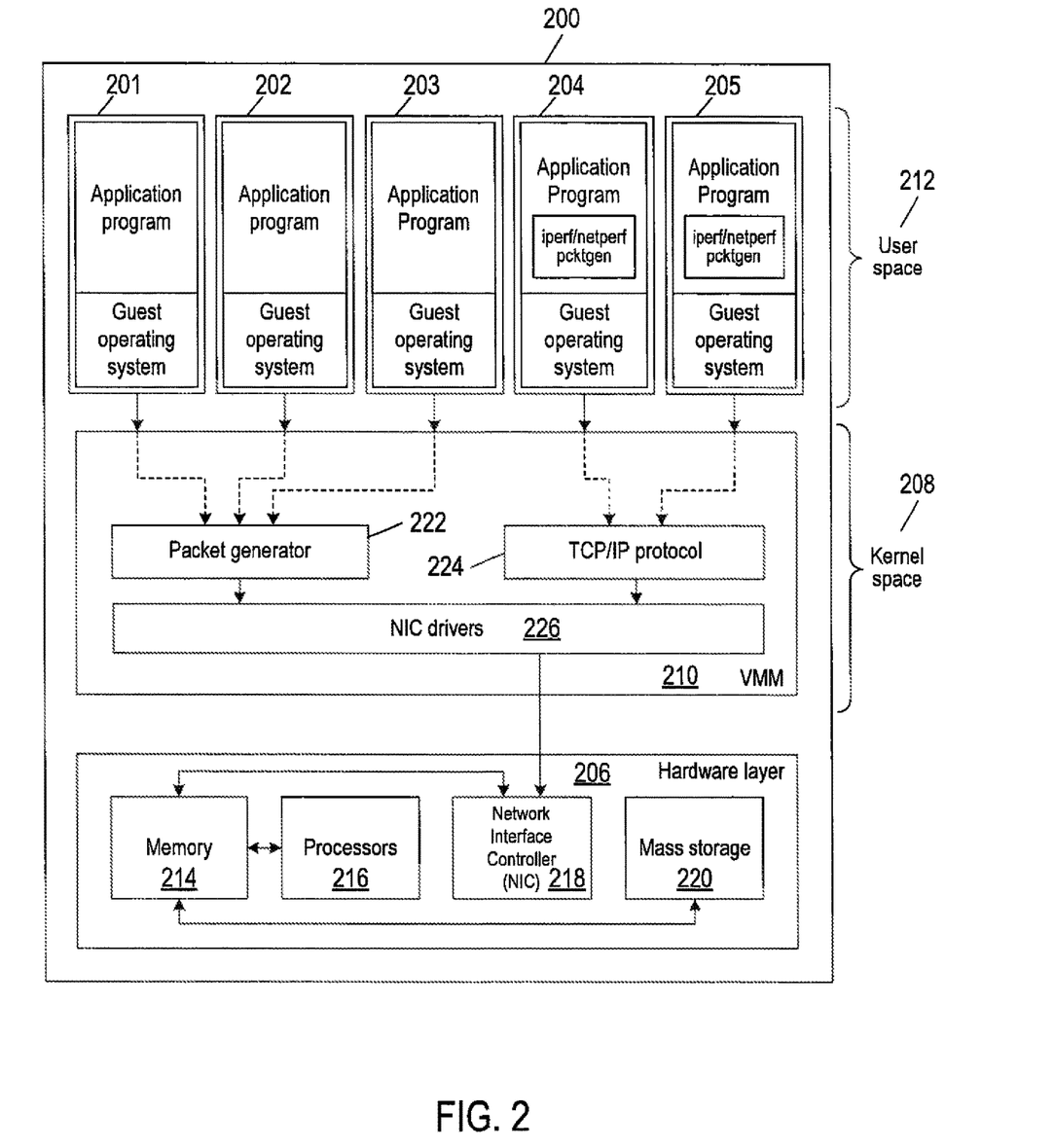
FIG. 2 shows an example architecture of a conventional host.

FIG. 2 shows an example architecture of a conventional host 200 that executes five VMs 201-205. The host 200 includes three fundamental layers: (1) a hardware layer 206, (2) a kernel space 208, and (3) a user space 212. The hardware layer 206 includes one or more processors 214, system memory 216, a network interface controller ("NIC") 216, and a mass-storage device 218. The hardware layer 206 also includes other components, including power supplies, internal communication links and busses, specialized integrated circuits, many different types of processor-controlled or microprocessor-controlled peripheral devices and other controllers. Each VM includes an application program or other higher-level computational entities packaged together with an operating system, called a "guest operating system." Each guest operating system interfaces to the kernel space 208 rather than to the hardware layer 206. The kernel space 208 includes a virtual-machine-monitor module 210 ("VMM") that virtualizes a pool of physical processors and memory in the hardware layer 206 to create virtual processors, virtual memory, and a virtual network that are available to each of the VMs 201-205. The VMM 210 includes a packet generator 220 implemented in a kernel module that performs packet generation, a kernel module with NIC drivers 222, and in this example, a kernel model that implements a TCP/IP protocol that specifies how data is packetized and addressed. In the example of FIG. 2, the VMs 201 and 202 send data to packet generator 220, which partitions the data into segments (i.e., payloads) and attaches a header to each payload to form data packets. The header contains routing information, such as the IP address of the host that generated the packet and the IP address of a destination. The destination can be another host in the data center 102 or a computer system on the internet. The header also contains information about the packet length and a protocol identifier that identifies the networking protocol used to generate the packet. The data packets are sent to the NIC drivers 223 and then to the NIC 216, which places the packets on the data center network ("DCN"). The VMs 203-205 include packet generators, such as iperf and/or netperf, that generate data packets for the applications running in the VMs 203-205. In this example, the packets are sent to a TCP/IP protocol 222, then to the NIC drivers 223, and finally to the NIC 216, which places the packets on the DCN.

The flow rate of data packets leaving the host 200 is determined by where a packet generator is located within the host. A packet generator may run in the user space of a host or in a module of the kernel space of the host. For example, a packet generator running in the user space sends packets to a protocol stack, such the TCP/IP protocol 222, and then directly to a driver of a network interface controller ("NIC"), and finally to the NIC 216 where the packets are placed on the DCN. By contrast, packets generated by a packet generator running in the kernel space are sent directly to the NIC driver 223 and then to the NIC 216, without using a protocol stack, which eliminates the protocol stack from impacting performance of the packet generator. However, generating packets in the user space 212 or the kernel space 208 as described above with reference to FIG. 2 are susceptible to variations in the time delays between data packets sent to the NIC 216. This variation is called packet jitter. Packet jitter is created in the kernel 208 space by variations in the speed of the PCI bus of the host, CPU speed, memory latency, and direct memory access latency. Large disruptions (i.e., latency) in the flow of packets to a destination often leads to artifacts that degrade the quality of data assembled at the destination.

In contrast to the conventional approach of placing packet generators in the kernel space or in the user space as illustrated by example in FIG. 2, this disclosure presents computer-implemented processes for generating data packets in an SNIC of a host. Placing packet generators in the SNIC eliminates packet jitter due to PCI bus speed, CPU speed, memory latency, and direct memory access latency of the host, thereby generating data packets with a consistent packet flow rate.

Figure 3:
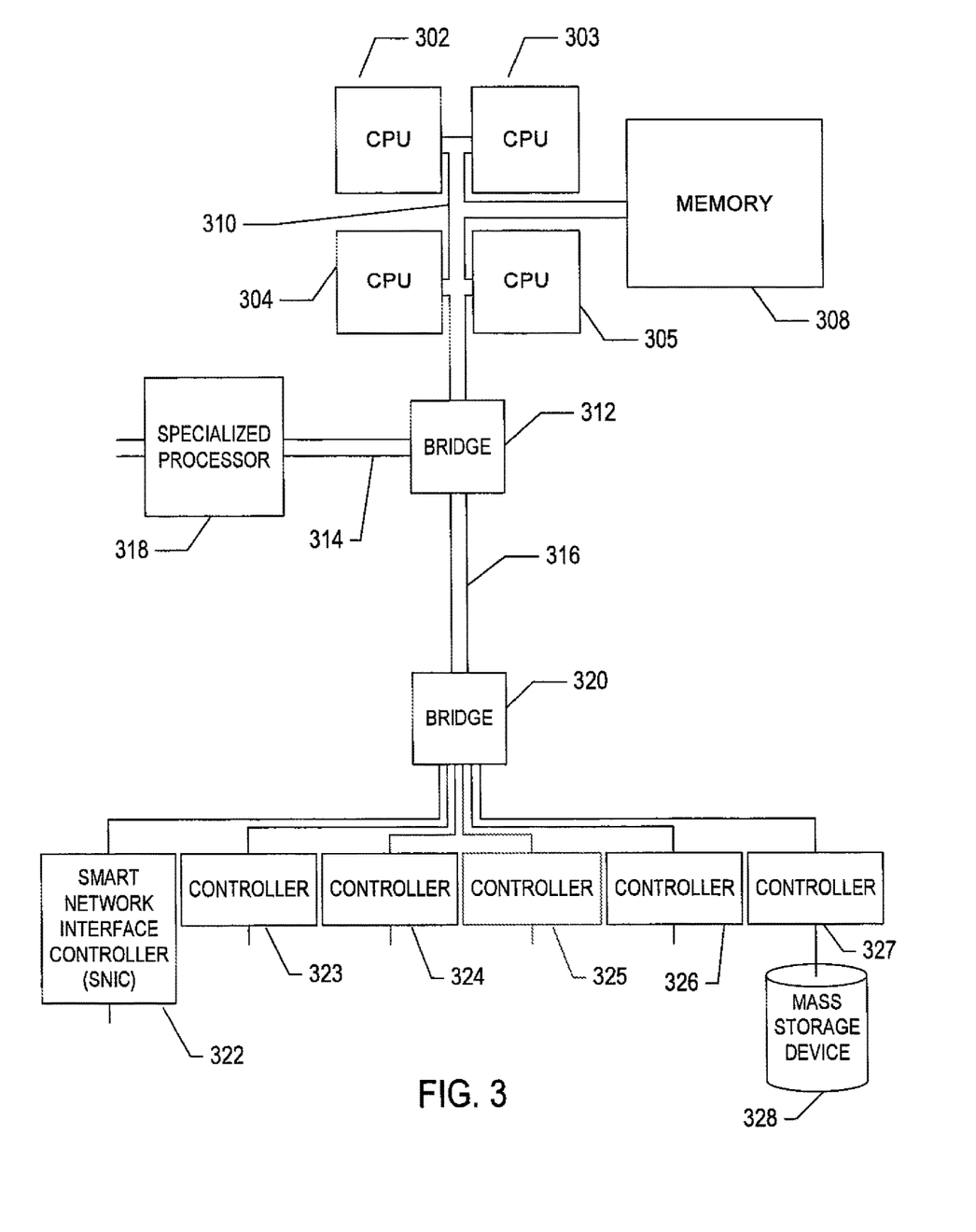
FIG. 3 shows an example architecture of a smart network interface controller ("SNIC") of a host shown in FIG. 2.

FIG. 3 shows an example architecture of a host that contains an SNIC. The host contains multiple central processing units ("CPUs") 302-305, one or more electronic memories 308 interconnected with the CPUs by a CPU/memory-subsystem bus 310 or multiple busses, a first bridge 312 that interconnects the CPU/memory-subsystem bus 310 with additional busses 314 and 316, or other types of high-speed interconnection media, including multiple, high-speed serial interconnects. The busses or serial interconnections, in turn, connect the CPUs and memory with specialized processors, such as a graphics processor 318, and with one or more additional bridges 320, which are interconnected to a trusted platform module, a SNIC 322, and multiple controllers 323-327. The controllers 322-327 are connected to the bridge 320 with high-speed serial links, such as peripheral component interconnect express ("PCIe") serial expansion busses. The controllers 323-327 are expansions cards that interface with different types of peripheral devices. The SNIC 322 is a component that connects the host to a DCN as shown in FIG. 1. An example implementation of the SNIC 322 is described below with reference to FIG. 4. The controller 327 interfaces with a computer-readable medium 328. The other controllers 323-326 can interface with electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the host to interact with human users. The computer-readable medium 328 is a data-storage device, including electronic memory, optical or magnetic disk drive, a magnetic tape drive, USB drive, flash memory and other such data-storage device.

Figure 4:
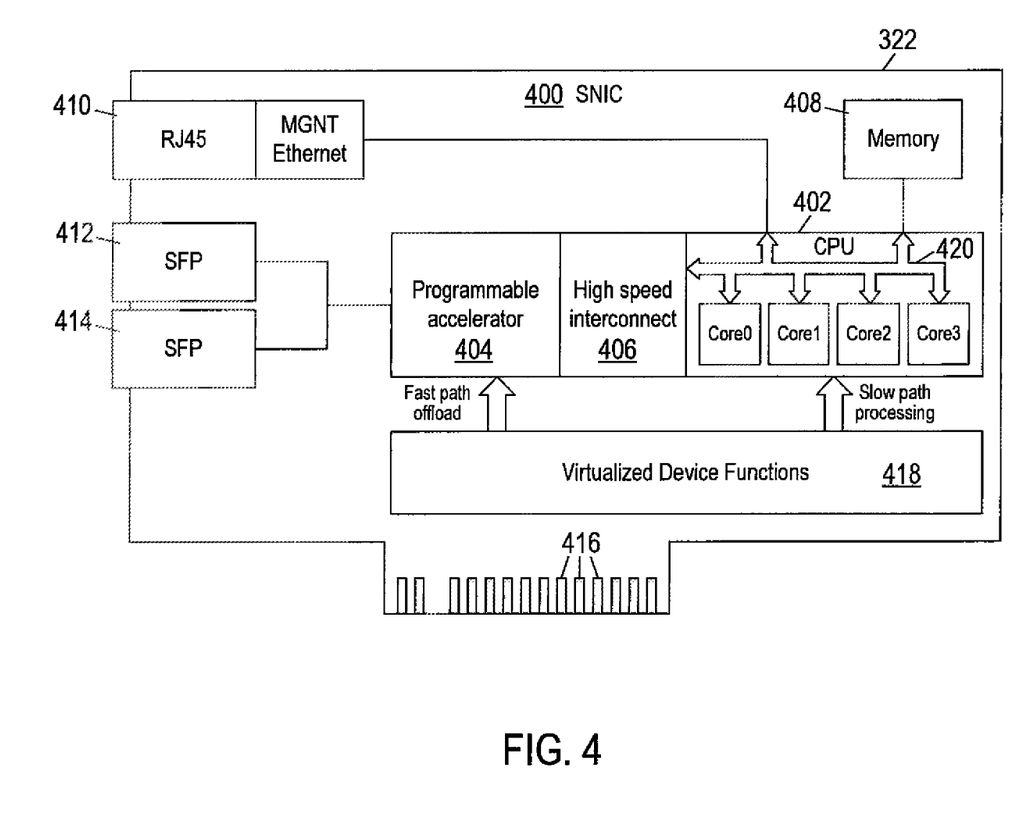
FIG. 4 shows an example architecture of the shown in FIG. 3.

FIG. 4 shows an example architecture of the SNIC 322 shown in FIG. 3. The SNIC 322 comprises a CPU 402 that is connected to a programmable accelerator 404 via a high-speed interconnect 406 mounted on a printed circuit board 400. The SNIC 322 includes memory 408 that is mounted on the circuit board 400 and connected to the CPU 402. In this example, the CPU 402 is connected to an RJ45 modular ethernet connector 410. The programmable accelerator 404 is connected to two small form-factor pluggable ("SFP") connectors 412 and 414 that may be used to connect with fiber-optic cables. The circuit board 400 includes an array of pins 416 that are inserted into an electrical connector, such as an expansion slot, of a mother board of the host. The SNIC 322 includes non-volatile memory that stores virtual device functions 418, such as a virtual network adapter that provides high performance in virtual machines ("VMs") running on the SNIC 322. In this example, the CPU 402 comprises four cores, denoted by core0, core1, core2, and core3, that are connected by a bus interface 420. The SNIC 322 is not limited to a CPU with just four cores. In other implementations the CPU 402 may contain as few as two cores. While in still other implementations the CPU 402 may contain more than four cores.

Figure 5A:
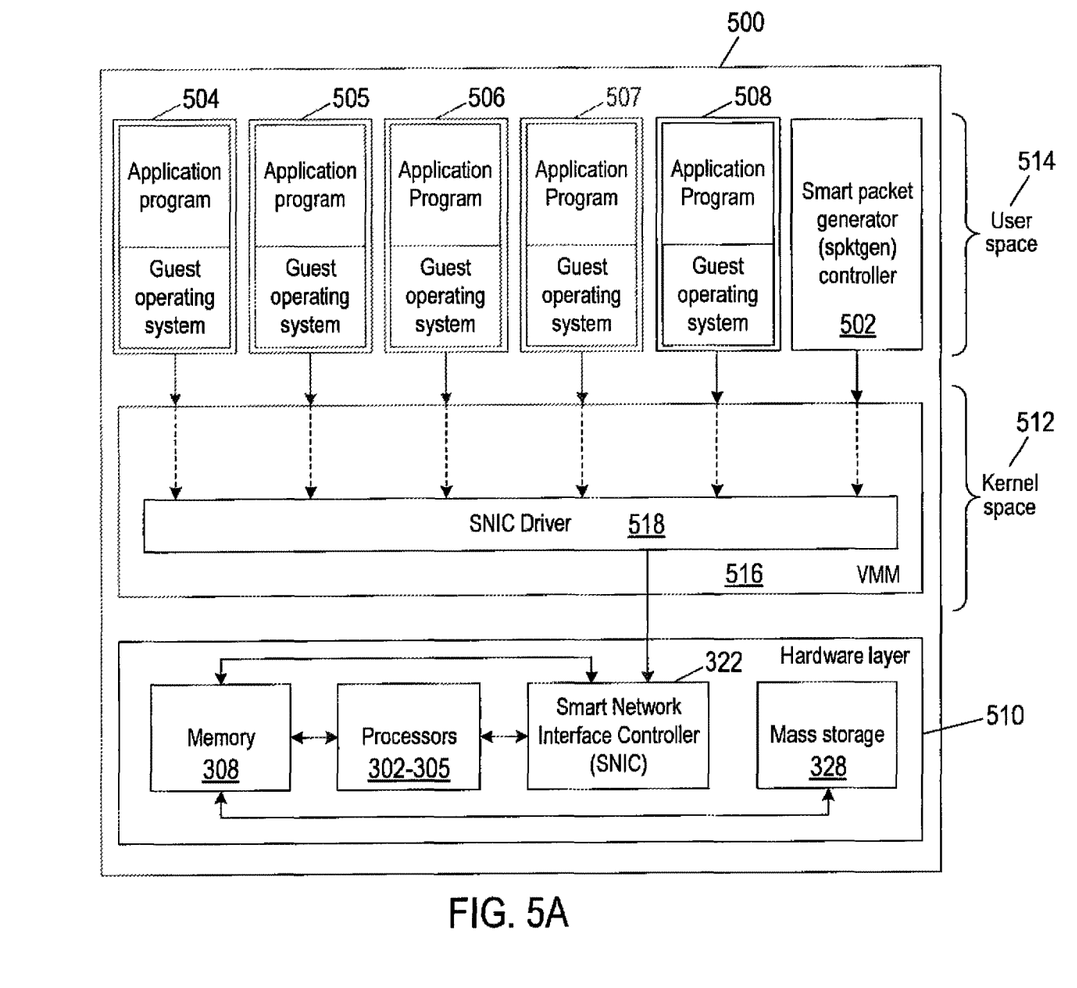
FIG. 5A shows an example architecture of a host that runs a smart packet generator ("spktgen") controller.

Computer-implemented processes for generating data packets in the SNIC 322 of a host include a smart packet generator ("spktgen") controller that runs in the user space of the host. FIG. 5A shows an example architecture of a host 500 that runs a spktgen controller 502. In this example, the host 500 runs five VMs 504-508. The host 500 includes a hardware layer 510, a kernel space 512, and a user space 514. The hardware layer 510 includes the processors 302-305, memory 308, SNIC 322, and mass-storage device 328. The hardware layer also includes other components (not shown), such as power supplies, internal communication links and busses, specialized integrated circuits, many different types of processor-controlled or microprocessor-controlled peripheral devices and other controllers identified in FIG. 3. Each VM includes an application program or other higher-level computational entities packaged together with a guest operating system that interfaces with the kernel space 512 rather than directly to the hardware layer 510. The kernel space 512 includes a VMM 516 that virtualizes the physical processors and memory in the hardware layer 510 to create virtual processors, virtual memory, and a virtual network that are available to the VMs 504-508. The VMM 516 includes a kernel module that runs the SNIC driver 518 that sends data generated by the VMs 504-508 to the SNIC 322, where the data is packetized as described below prior to being placed on the DCN. The spktgen controller 502 is implemented as a script program that provides users, such as a systems administrator, with a command line for entering commands that control how the SNIC 322 performs packet generation. For example, a systems administrator or systems manager may access the command line of the spktgen controller 502 via the PC 106.

Figure 5B:
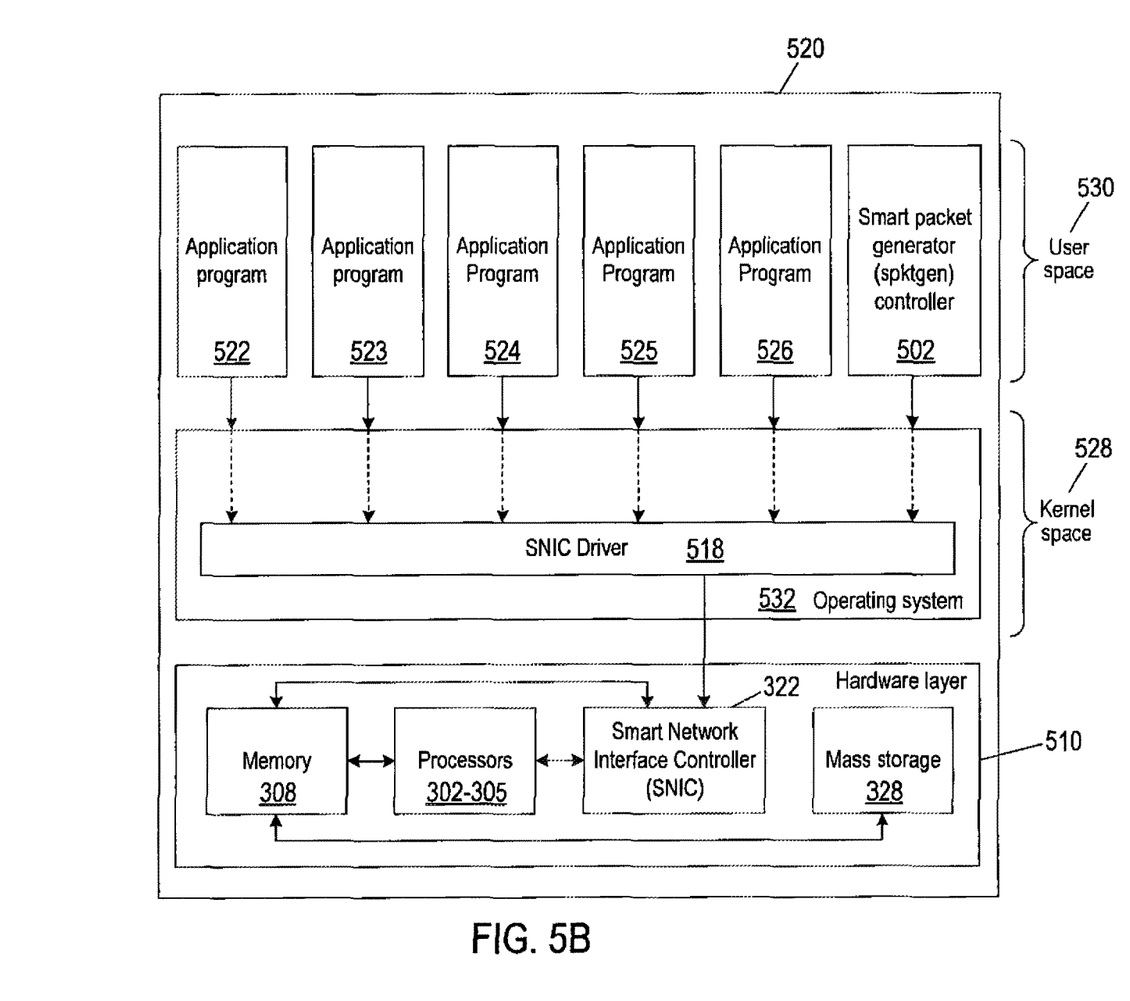
FIG. 5B shows an example architecture of a host that runs a spktgen controller 502.

Figure 5B shows another example architecture of a host 520 that runs the spktgen controller 502. In this example, the host 520 runs five applications 522-526. The host 520 includes the hardware layer 510 described above with reference to FIG. 5A. The host 520 includes a kernel space 528 and a user space 530. In this example, the user space 530 comprises the applications 522-526 and the spktgen 502. The kernel space 528 is a host operating system 532 that runs the SNIC driver 518 described above in a kernel module of the operating system. The spktgen controller 502 is implemented as a script program that provides users, such as a systems administrator, with a command line for entering commands that control how the SNIC 322 performs packet generation. For example, a systems administrator or systems manager may access the command line of the spktgen controller 502 via the PC 106.

Computer-implemented processes for generating data packets in the SNIC 322 of hosts are implemented with a spktgen daemon and a spktgen engine that run in a core of the CPU 402 of the SNIC 322. The core that runs the spktgen daemon and the spktgen engine is called the "control core." The remaining cores of the CPU 402 execute packet generating protocols in accordance with instructions from the spktgen engine running in the control core. The cores that perform packet generation are called "data cores."

Figure 6:
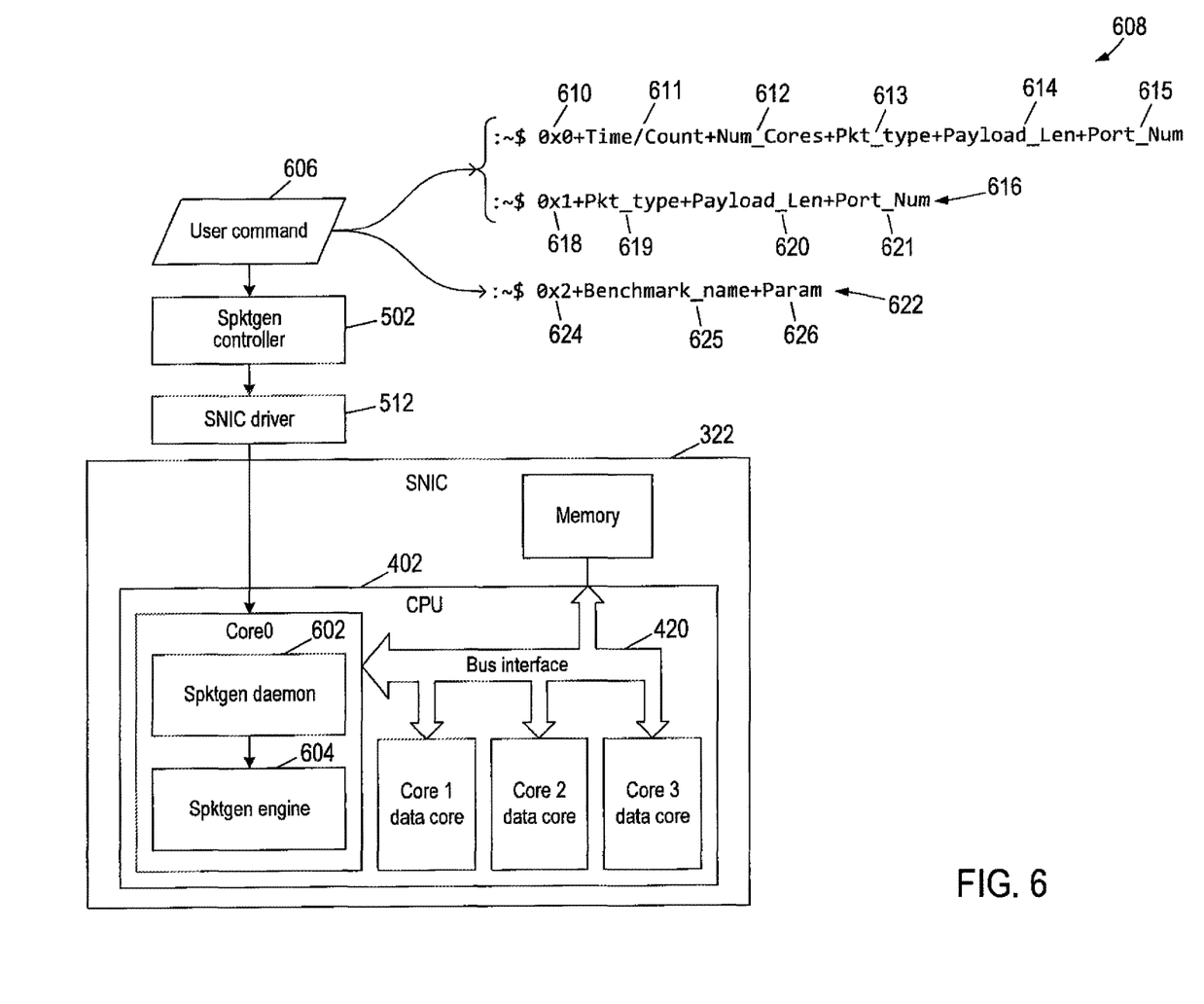
FIG. 6 shows examples of commands input to a spktgen controller.

FIG. 6 shows examples of commands input to the spktgen controller 502 and shows a spktgen daemon 602 and a spktgen engine 604 running in core0 of the CPU 402 of the SNIC 322. For the sake of brevity, other components of the SNIC 322 shown in FIG. 4 are not shown in FIG. 6. In this example, core0 is designated as the control core for performing the operations of the spktgen daemon 602 and the spktgen engine 604 described below with reference to FIG. 7. The spktgen daemon 602 and the spktgen engine 604 can perform three different modes of packet generation at the data cores as selected by a user. The three modes are called "interactive mode," "non-interactive performance mode," and "non-interactive function mode." The spktgen controller 502 displays a command prompt in a user interface of the PC 106 that enables a user to input a user command 606 that designates the mode and the parameters associated with the mode. The general form of the user command 606 input at the command prompt is given by :~$ spktgen mode+parameters The command "spktgen mode" identifies either an interactive mode or a non-interactive mode performed by the spktgen engine 604. The "parameters" portion of the command comprises parameters that the spktgen engine 604 uses to control how packets are generated at the data cores. If the user desires to execute a non-interactive mode, the command "spktgen mode" designates one of two sub-modes identified as non-interactive performance mode and non-interactive function mode.

FIG. 6 shows an example format of a non-interactive performance mode command 608. The performance mode command 608 includes a parameter 610 that identifies the command as non-interactive performance mode, a parameter 611 that indicates the amount of time for sending packets or total number of packets (i.e., count) to send, and a parameter 612 designating the number of data cores to use. The command 608 includes a parameter 613 designating the type of packet generator to use for packet generation, such as a media access control ("MAC") packet generator, a IPv4/IPv6 packet generator, a TCP packet generator, or a user data protocol ("UPD") packet generator. The command 608 also includes a parameter 614 designating payload length (e.g., number of bytes in the payload) and a parameter 615 identifying a port number of the SNIC 322 used to place the data packets onto the DCN.

FIG. 6 shows an example format of a non-interactive function mode command 616. The function mode command 616 includes a parameter 618 that identifies the command as a non-interactive function mode, an instruction 619 designating the type of packet generator (e.g., MAC packet generator, a IPv4 or IPv6 packet generator, TCP packet generator, or a UPD packet generator), an instruction 614 designating payload length, and an instruction 621 identifying a port number of the SNIC 322 used to place the data packets onto the DCN.

FIG. 6 shows an example format of an interactive mode command 622. The interactive mode command 622 includes a parameter 624 that identifies the command as an interactive mode, a parameter 625 that sets the interactive packet generation as iperf or netperf, and a parameter 626 that represents any of various other parameters, such as packet type, payload length, and port number of the SNIC for placing data packets onto the DCN.

Figure 7:
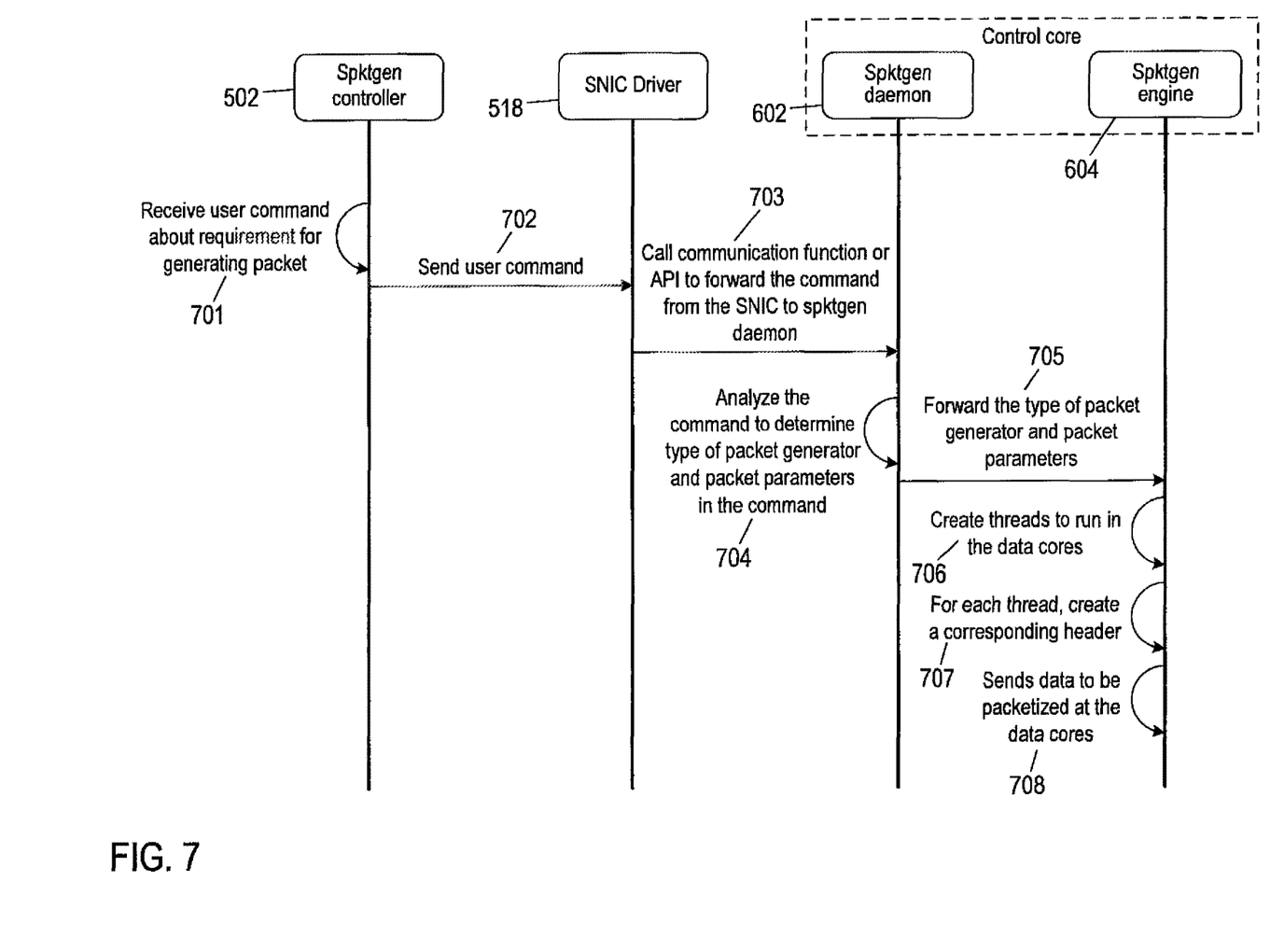
FIG. 7 shows a flow diagram of operations performed by a spktgen controller, a SNIC driver, a spktgen daemon, and a spktgen engine.

FIG. 7 shows a flow diagram of the operations performed by the spktgen controller 502, the SNIC driver 518, the spktgen daemon 602, and the spktgen engine 604. The spktgen controller 502 is a shell script that enables a user to input a command described above with reference to FIG. 6. A user can input an interactive or non-interactive mode command described above with reference to FIG. 6. The spktgen controller 502 receives 701 the command and sends 702 the command to the SNIC driver 518. The SNIC driver 518 calls a thread that executes a communication function or API for exchanging information between the host and the SNIC 322. The CPU 402 loads the spktgen daemon 602 and the spktgen engine 604 from the memory 408 into one of the cores, such as core0 in FIG. 6. As a result, core0 becomes the control core for the process of generating data packets. The spktgen daemon 602 extracts the command to determine the mode (i.e., interactive mode, non-interactive performance mode, or non-interactive function mode) and other packet parameters recorded in the command, such as type of data packet generator, packet length, and port number. The spktgen daemon 602 forwards 705 the mode and packet parameter instructions to the spktgen engine 604. In accordance with the instructions received from the spktgen daemon 602, the spktgen engine 604 creates 706 threads that run in each of the data cores. For example, the spktgen engine 604 sets the number of cores to generate packets in accordance with the performance mode command 608. Each thread comprises a set of instructions for generating packets in accordance with the parameters of the command and a transmit ("TX") function for outputting packets in regular time intervals. The spktgen engine 604 controls execution of each thread. For each thread, the spktgen engine 604 creates and sends 707 a corresponding header to be added to each data packet output from a data core. The spktgen engine 604 sends 708 data to the data cores where packets are generated by each data core according to a schedule executed by the spktgen engine 604.

Figure 8:
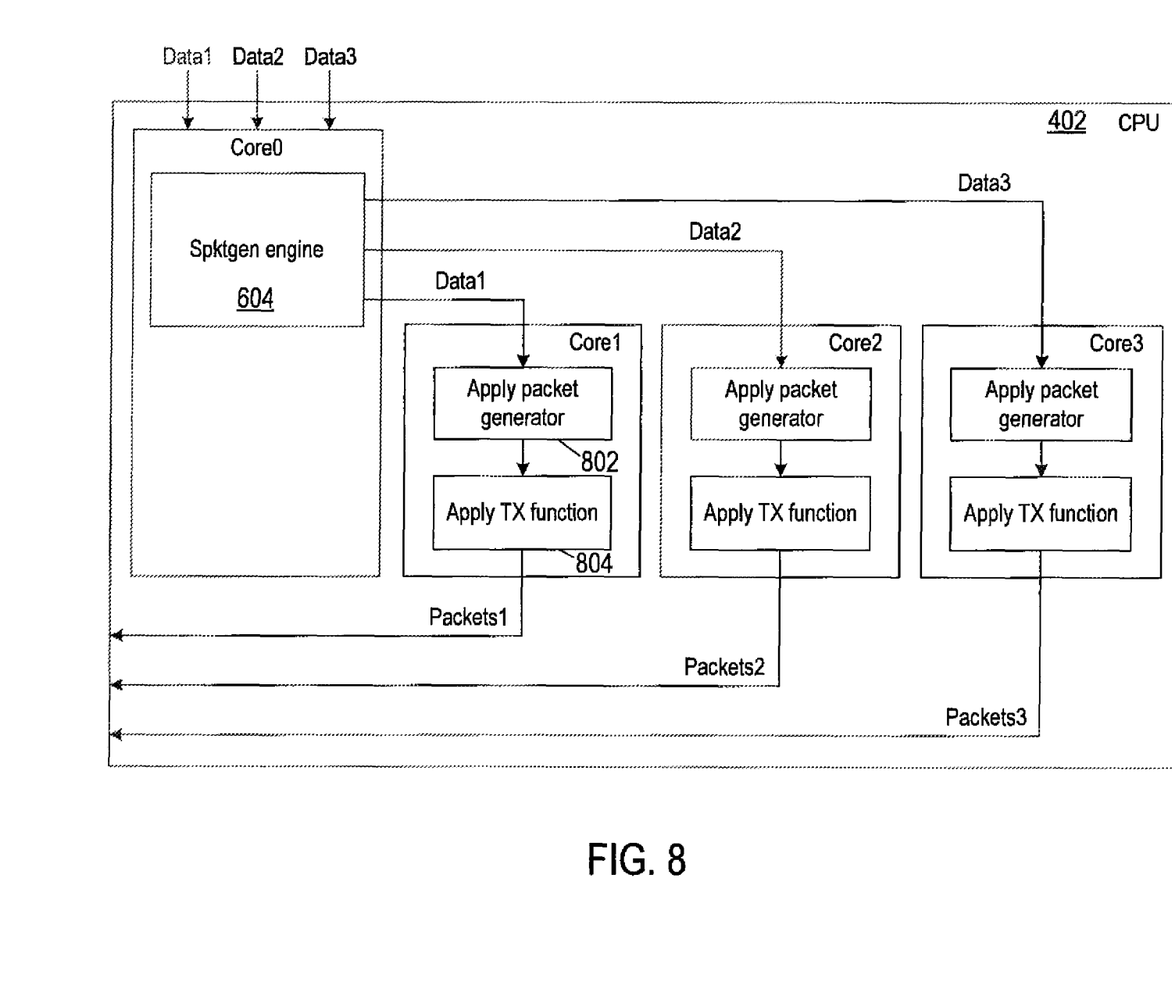
FIG. 8 shows an example of the spktgen engine executing packet generation on data generated by sources within a host.

FIG. 8 shows an example of the spktgen engine 604 of the control core0 executing packet generation on data generated by sources within the host 500. For example, the data may be generated by any of the applications running in the VMs 504-508 in the host 500. For example, Data1, Data2, and Data3 represents blocks or streams of data generated by three different data sources running in the host 500, such as VMs 504, 505, and 506. The spktgen engine 604 receives the data generated by the three different sources and assigns the data to threads running in each of the data cores: core1, core2, and core3. The spktgen engine 604 forwards Data1 to a packet generating thread running in core1, forwards Data2 to a packet generating thread running in core2, and forwards Data3 to a packet generating thread running in core3. As shown in the example of FIG. 8, each thread applies a user selected packet generating protocol and applies a TX function that outputs the data packets in regularly spaced time intervals. For example, the thread in core1 applies a packet generating protocol 801 to Data1. If the user has entered an interactive mode, the packet generator can be iperf or netperf. On the other hand, if the user has entered a non-interactive mode, the packet generator can be MAC packet generator, a IPv4 or IPv6 packet generator, TCP packet generator, or a UPD packet generator. The thread ensures that packets are output from the packet generator 801 in accordance with the user-selected packet parameters. After the packets have been generated by the packet generator, the thread applies the TX function 802 to output the data packets Packets1 from the CPU 402 on a port selected by the user in the command.

Figure 9:
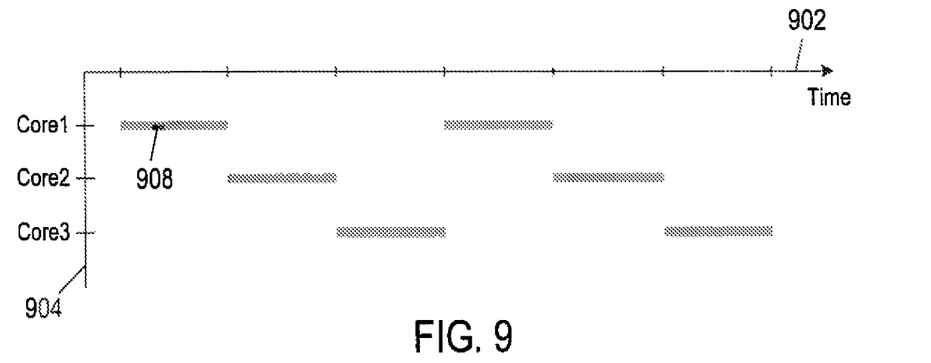
FIG. 9 shows an example of a round-robin schedule for generating data packets with three data cores.

The spktgen engine 604 can execute any of many different types of scheduling. In one implementation, the spktgen engine 604 assigns different data sources to certain data cores, such that the data cores generate data packets in parallel. For example, core1 may be used to generate data packets for the data generated by VMs 504 and 505, core2 may be used to generate data packets for the data generated by VMs 506 and 507, and core3 may be assigned to generate data packets for the data generated by VM 508. In another implementation, the spktgen engine 604 assigns generating packets according to a round robin schedule in which each data core generates packets for a different interval of time. FIG. 9 shows an example of a round-robin schedule for generating data packets with core1, core2, and core3. Horizontal axis 902 represents time. Vertical axis 904 represents the cores. Bars, such as bar 908, represent time intervals in which each core generates data packets for the host. In another implementation, the spktgen engine 604 assigns generating packets according to a round robin schedule in which each data core generates a fixed number of data packets before packet generation moves to a next data core in the schedule. Round robin scheduling may be used where the SNIC has fewer outputs than data cores in order to prevent congestion and dropped packets at the SNIC connectors.

Figure 10:
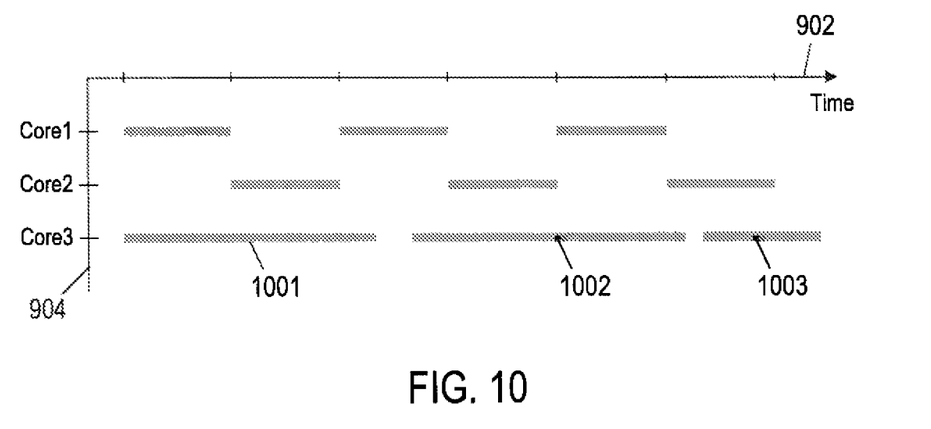
FIG. 10 shows an example of cores generating data packets in parallel according to different schedules.

In another implementation, the spktgen engine 604 assigns one or more data cores to exclusively generate packets for one or more data sources and assigns the remaining data cores to generate data packets according to a round robin schedule. FIG. 10 shows an example of core1 and core2 generating packets according to a round-robin schedule in which the cores take turns generating packets in alternating time intervals and core3 generates packets in time intervals 1001-1003 that are not coordinated with the round robin scheduling of core1 and core2.

In another implementation, the spktgen engine 604 uses one or more data cores to output data packets in one SNIC connector while other data cores are used in parallel to generate packets that are output in an another SNIC connector. For example, packets generated by core1 and core2 may be output from the SNIC 322 with the RJ45 connector 410 while packets are generated by core3 and output from the SNIC with the SFP connectors 412 and 414. Alternatively, packets generated by core1 and core2 may be output from the SNIC 322 with the SFP connectors 412 and 414 while packets generated by core3 are output from the SNIC with the RJ45 connector 410.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. Apparatus for generating data packets from data generated by data generating sources running in a host, the apparatus comprising:
   a smart packet generator ("spktgen") controller for receiving a user command entered via a monitor;
   a spktgen daemon for receiving the user command from the spktgen controller and extracting information identifying a type of packet generator and packet parameters recorded in the user command; and
   a spktgen engine for creating threads in one or more data cores of a multicore processor of a smart network interface controller ("SNIC") of the host, each thread comprising instructions for generating data packets from the data generated by the data generating sources of the host in accordance with the type of packet generator and the packet parameters extracted from the user command.

2. The apparatus of claim 1 wherein the spktgen controller runs in a user space of the host.

3. The apparatus of claim 1 wherein the spktgen daemon and the spktgen engine run in a control core of the multicore processor of the SNIC.

4. The apparatus of claim 1 wherein the spktgen engine creates a header for each data packet created in the one or more data cores.

5. The apparatus of claim 1 wherein the spktgen engine sends the data generated by the data generating sources to the one or more cores.

6. The apparatus of claim 1 wherein each thread packetizes the data generated by one of the data generating sources into data packets.

7. A process for generating data packets in a smart network interface controller ("SNIC") of a host from data generated by data generating sources running in the host, the process comprising:
   extracting a type of packet generator and packet parameters for each data packet to be output from the SNIC from a user command;
   creating a thread in each of one or more data cores of a multicore processor of the SNIC, each thread comprising instructions for generating data packets in accordance with the type of packet generator and the packet parameters extracted from the user command; and
   forming data packets from the data generated by the data generating sources at the one or more data cores in accordance with the instructions executed by the threads; and
   outputting the data packets from each data core through ports of the SNIC identified in the user command.

8. The process of claim 7 further comprises generating packet headers in a control core of the multicore processor and sending the packet headers to the one or more data cores.

9. The process of claim 7 wherein forming data packets comprises partitioning the data at each data core into payloads, each payload having a payload length identified in the user command.

10. The process of claim 7 wherein forming data packets comprises applying the type of packet generator identified in the user command.

11. The process of claim 7 wherein forming data packets comprises applying a transmission function that generates each data packet in regularly spaced time intervals.

12. A smart network interface controller ("SNIC") for generating data packets from data generated by data generating sources running in a host, the SNIC comprising:
   a control core of a multicore processor that extracts instructions for generating packets according to a user selected type of packet generator and packet parameters from a user command and creates threads, such that each thread comprises instructions for generating data packets from the data generated by the data generating sources in accordance with the type of packet generator and the packet parameters; and
   one or more data cores of the multicore processor, such that each data core packetizes data sent to the data core into data packets in accordance with the instructions of one of the threads.

* * * * *